(12) United States Patent
Guillou

(10) Patent No.: US 11,709,469 B2
(45) Date of Patent: Jul. 25, 2023

(54) METHOD FOR OPTIMISING THE PHYSICAL MODEL OF AN ENERGY INSTALLATION AND CONTROL METHOD USING SUCH A MODEL

(71) Applicant: COMMISSARIAT À L'ENERGIE ATOMIQUE ET AUX ENERGIES ALTERNATIVES, Paris (FR)

(72) Inventor: Hervé Guillou, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 78 days.

(21) Appl. No.: 17/127,157

(22) Filed: Dec. 18, 2020

(65) Prior Publication Data

US 2021/0191352 A1    Jun. 24, 2021

(30) Foreign Application Priority Data

Dec. 19, 2019 (FR) ....................... 1914900

(51) Int. Cl.
*G05B 19/042* (2006.01)
*G06F 30/20* (2020.01)
(Continued)

(52) U.S. Cl.
CPC .......... *G05B 19/042* (2013.01); *G05B 17/02* (2013.01); *G06F 30/20* (2020.01); *G05B 2219/2639* (2013.01); *G06F 2111/04* (2020.01)

(58) Field of Classification Search
CPC .............. G05B 19/042; G05B 17/02; G05B 2219/2639; G06F 30/20; G06F 2111/04;
(Continued)

(56) References Cited

U.S. PATENT DOCUMENTS

2020/0006944 A1* 1/2020 Fife .................. H02J 3/381

FOREIGN PATENT DOCUMENTS

FR    3 058 804 A1    5/2018

OTHER PUBLICATIONS

Matthew A. Williams et al: "Dynamical Graph Models of Aircraft Electrical, Thermal, and Turbomachinery Component" Journal of Dynamic Systems, Measurement, and Control; Dec. 19, 2017. (Year: 2017).*

(Continued)

*Primary Examiner* — Chad G Erdman
(74) *Attorney, Agent, or Firm* — Pillsbury Winthrop Shaw Pittman LLP

(57) ABSTRACT

A method for determining a physical model of an energy installation from a plurality of components linked together according to one or more constraints to form a tree, called tree of constraints, each component including one or more output ports, each output port being associated with a physical quantity of which the value depends on one or more variables internal to the component and/or on one or more variables external to the component, each external variable being communicated to the component through an input port. A second aspect relates to a method for controlling an electrical installation including a first phase of determining a physical model of the installation using the described method; and a second control phase during which each set point is determined as a function of a simulation carried out using the physical model obtained during the phase of determining a physical model of the energy installation.

8 Claims, 2 Drawing Sheets

(51) Int. Cl.
*G05B 17/02* (2006.01)
*G06F 111/04* (2020.01)

(58) Field of Classification Search
CPC ... G06F 2111/10; G06F 2113/04; G06F 30/18
See application file for complete search history.

(56) References Cited

OTHER PUBLICATIONS

Search Report as issued in French Patent Application No. 1914900, dated Jul. 29, 2020.
Koeln, J. P., et al., "Hierarchical Control of Aircraft Electro-Thermal Systems," IEEE Transactions on Control Systems Technology, vol. 28, No. 4, Apr. 2019, XP011793249, pp. 1218-1232.
Williams, M. A., et a., "Dynamical Graph Models of Aircraft Electrical, Thermal, and Turbomachinery Components," Journal of Dynamic Systems, Measurement, and Control, vol. 140, No.4, Dec. 2017, XP055716943, 17 pages.

* cited by examiner

[Fig. 1]
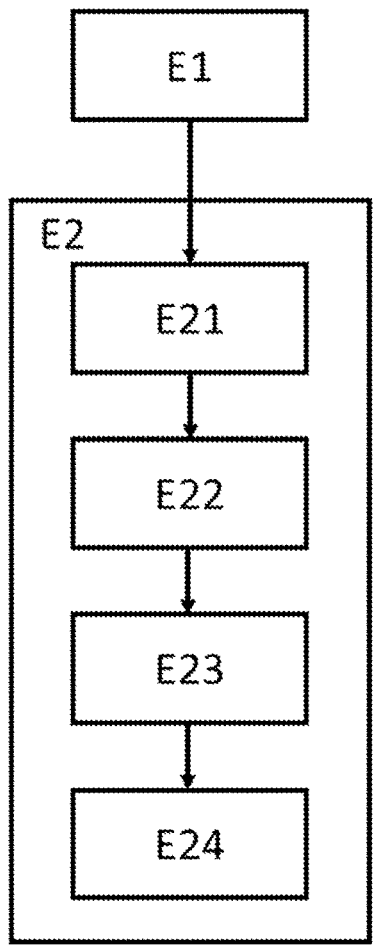
[Fig. 2]
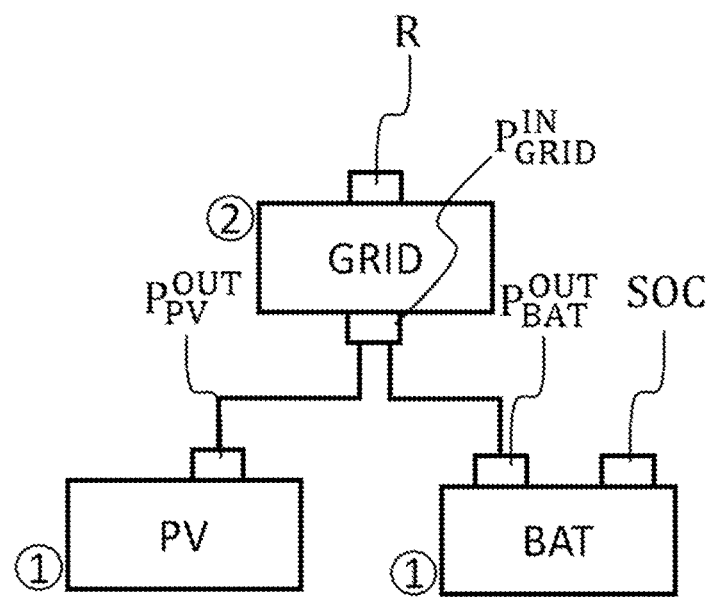

[Fig. 3]
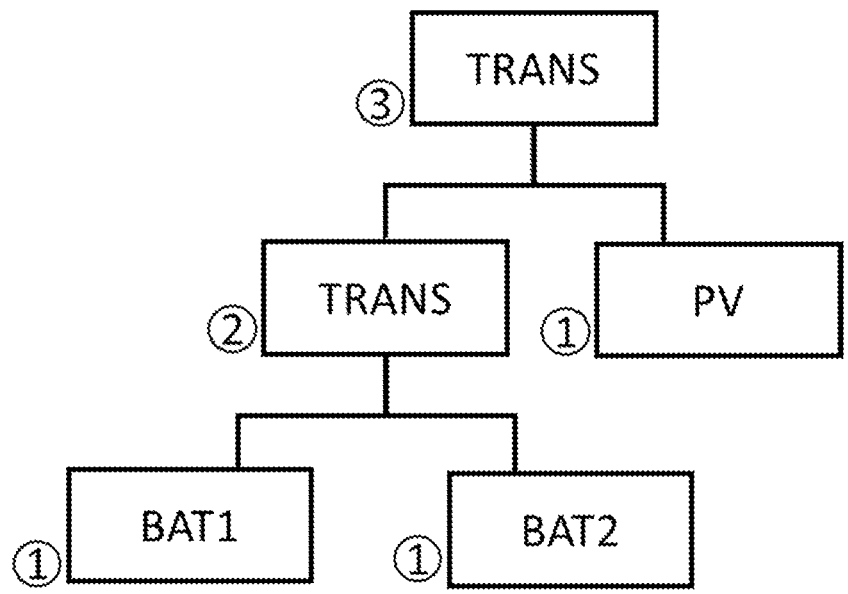

METHOD FOR OPTIMISING THE PHYSICAL MODEL OF AN ENERGY INSTALLATION AND CONTROL METHOD USING SUCH A MODEL

CROSS-REFERENCE TO RELATED APPLICATIONS

This application claims priority to French Patent Application No. 1914900, filed Dec. 19, 2019, the entire content of which is incorporated herein by reference in its entirety.

FIELD

The technical field of the invention is that of the optimisation of energy installations.

The present invention relates to a method for optimising the use of an energy installation and in particular a method making it possible to minimise the number of variables and constraints of the physical model of the energy installation of which it is sought to optimise the on-line operation. The invention also relates to a control method using such a model.

BACKGROUND

When it is sought to control an energy installation in an optimal manner, it is necessary to be able to model this installation so as to anticipate, at least in an approximate manner, the operation of the energy sources that compose it.

Physical models of energy components are thus used to model the energy installation with the aim of optimising its operation over a given anticipative horizon, for example over the forthcoming 24 hours, in order to generate the optimal set points to apply for each of the energy components. It is however necessary to make compromises on the complexity of the models used to determine, within a reasonable time, the operating set points of these energy components before being able to perform a simulation of the energy installation. The compromise thus made has the consequences of having to reduce the complexity of the models of energy components used, which are very complex in view of the number of variables and constraints, which makes it necessary to reduce this complexity and impacts the accuracy of the generated control set points.

There thus exists a need for a method making it possible to obtain a precise physical model while limiting to the maximum the computational resources required for its implementation.

SUMMARY

The invention offers a solution to the aforementioned problems, by making it possible to obtain a precise physical model comprising a limited number of variables and constraints.

To do so, a first aspect of the invention relates to a method for determining a physical model of an electrical installation from a plurality of components linked together according to one or more constraints so as to form a tree, called tree of constraints, each component comprising one or more output and/or input ports, each port being associated with a physical quantity of which the value depends on one or more variables internal to the component and/or on one or more variables external to the component, each external variable being communicated to the component through an input port; said method comprising:

a step of allocating a level to each component:
  the components only comprising output ports, called leaf components on the tree of constraints, being allocated the lowest level;
  the components comprising one or more input ports being allocated a level greater by one than the maximum level of the components connected on said input port(s);
a step of determining a plurality of reduced constraints comprising, for each level starting from the lowest level and for each component of the considered level:
  when the component is associated with one or more internal variables, a sub-step of creating the internal variable(s) of the component;
  when the component is associated with one or more internal variables, a sub-step of determining the expression of each output port depending on at least one internal variable of the component;
  when the component comprises at least one input port associated with at least one external variable, a sub-step of determining the expression of each output port depending on at least one variable external to the component;
  a sub-step of determining the constraints linking the internal variables of the component and the external variables if they exist so as to obtain the reduced constraint(s) associated with the considered component.

The plurality of reduced constraints obtained at the end of the method according to a first aspect of the invention determines the physical model of the electrical installation. Thus, starting from a given representation of the energy system (expressed in the form of a tree of constraints) the number of variables and constraints governing the model is reduced, which reduces by as much the complexity of the computations associated with the use of a model obtained using the method according to a first aspect of the invention. Thus, for a same representation of an energy system (and thus a same precision in the set point trajectories obtained), the method according to the invention makes it possible to obtain a more efficient physical model than the methods used previously.

Furthermore, the determination of reduced constraints starting from the lowest level to the highest level makes it possible to conserve a reasonable dimension of analytical problem at the overall level thus being able to be resolved and optimised at the overall level by conventional tools. This overall level resolution ensures an overall optimum is obtained which is better than a simple aggregation of solutions of local sub-problems. In other words, the method according to the invention makes it possible to treat the problem in its entirety and not by subdividing it into sub-problems to next resolve these sub-problems in an independent manner.

A second aspect of the invention relates to a method for controlling an energy installation comprising a first phase of determining a physical model of said installation using a method according to a first aspect of the invention; and a second control phase during which each set point is determined as a function of a simulation carried out using the physical model obtained during the phase of determining a physical model of the electrical installation.

A third aspect of the invention relates to a computer programme comprising instructions which, when the programme is executed by a computer, lead it to implement the method according to a first or a second aspect of the invention.

A fourth aspect of the invention relates to a computer readable data support, on which is recorded the computer programme according to a third aspect of the invention.

The invention and the different applications thereof will be better understood on reading the description that follows and by examining the figures that accompany it.

BRIEF DESCRIPTION OF THE FIGURES

The figures are described for indicative purposes and in no way limit the invention.

FIG. 1 represents a flowchart of a method according to the invention.

FIG. 2 shows a schematic representation of a first system of which it is sought to determine the physical model.

FIG. 3 shows a schematic representation of a second system of which it is sought to determine the physical model.

DETAILED DESCRIPTION

The figures are described for indicative purposes and in no way limit the invention.

A first aspect of the invention relates to a method 100 for determining a physical model of an energy installation from a plurality of components.

In order to represent the energy installation, the components are linked together according to one or more constraints so as to form a tree, called tree of constraints. A component defines an object contributing to the production, to the consumption or to the transport (electric, photovoltaic, battery charge, etc.), to the conversion (converter, transformer) or instead a strategic object (regulator). In addition, each component comprises one or more ports, each port being associated with a physical quantity of which the value depends on one or more variables internal to the component and/or on one or more variables external to the component. The internal variables are either parameters of the component, or data concerning the component. Moreover, it is possible to distinguish two directions of ports: input (or IN) ports which receive an external parameter, and output (or OUT) ports which supply an external parameter. In addition, with each port are associated an identifier and a type. A tree of constraints thus comprises components linked together at the level of the ports as a function of the direction of said ports. It is important of note that several links may leave from or arrive at a same port. In addition, each link represents a constraint between the ports (that is to say between the physical quantities that said ports represent). In an embodiment, each link may be associated with an upper bound value and/or a lower bound value and represents an exchange of power between the different components. As will be seen hereafter, the method according to the invention makes it possible to propagate these constraints while minimising the number of variables appearing in the model thus obtained.

In the method according to the invention, the tree of constraints is obtained from all or part of the following data:
the components of the energy installation identified by a name and a type making it possible to identify the component (e.g. photovoltaic type, storage type, converter type, etc.);
each link between parent component (at the level of an input port) and daughter component (at the level of an output port);
the parameters and the temporal series associated with each component.

From these data, it is next possible to construct the components that comprises the energy installation on the basis of a library of models. Then, the nodes are instantiated (each node representing a component) and the links between the nodes are created, said links connecting parent components to daughter components. The nodes thus linked constitute the tree of constraints used in the present method for determining a model of the electrical installation.

Generally speaking, the components forming the leaves of the tree of constraints represent energy sources (photovoltaic panels, wind powered panels, batteries, fuel cells, etc.), or consumption sources (buildings, etc.).

For the other components, the sum of the values supplied at the level of the input ports is equal to the sum of the values supplied at the level of the output ports (thus reflecting the laws of conservation). It will be appreciated that other constraints may be added to the constraint associated with the law of conservation. Hereafter, the different steps of the method will be illustrated using the example illustrated in FIG. 2 and showing an installation comprising a photovoltaic component PV, a storage component ESS and a network component GRID.

The method 100 according to the invention comprises a step E1 of allocating a level to each component: the components not comprising any input port, called leaf component on the tree of constraints, being allocated the lowest level; the components comprising one or more input ports being allocated a level greater by one (1) than the maximum level of the components connected on said input port(s). Hereafter, in the figures, the levels are indicated using circled numbers situated on the left side of each component. In the example of FIG. 2, the storage component BAT and the photovoltaic component PV are allocated the level 1 (one) whereas the network component GRID is allocated the level 2 (two).

A second more complex example is illustrated in FIG. 3 and comprises a first storage component BAT1, a second storage component BAT2, a transformation component TRANS, a photovoltaic component PV and a network component GRID. In this second example, the first and the second storage components BAT1, BAT2 as well as the photovoltaic component PV are allocated the level 1. The transformation component TRANS is allocated for its part the level 2 since it is connected to components of level 1. The network component GRID is for its part allocated the level 3, the latter being connected to components of which the highest level is equal to 2 (level corresponding to the transformation component TRANS). It is thus here understood that, outside of the leaves, the level of a component can only be greater than the level of the components connected on its input ports.

The method 100 according to the invention next comprises a step E2 of determining a plurality of reduced constraints. This step comprises, for each level (in the example of FIG. 2, levels one and two) starting from the lowest level (in the example of FIG. 2, level one) and for each component of the considered level, the sub-steps E21, E22, E23, E24 described hereafter.

It comprises, when the component is associated with one or more internal variables, a sub-step E21 of creating the internal variable(s) of the component. In the example of FIG. 2, during this sub-step E21 the internal variables of the photovoltaic component PV and the storage component BAT are firstly created, said components having the lowest level (here 1). The photovoltaic component comprises for single internal variable the photovoltaic production noted $P_{PV}(t)$. The storage component comprises two internal variables: the state of charge noted SOC(t), the supplied (positive) or absorbed (negative) power $P_{BAT}(t)$.

It also comprises, when the component is associated with one or more internal variables, a sub-step E22 of determining the expression of the value of each output port depending on at least one variable internal to the component. In the example of FIG. 2, the value of the single output port of the photovoltaic component $P_{PV}^{OUT}(t)$ is given by the power produced $P_{PV}(t)$. The storage component comprises two output ports: a first output port associated with the supplied or absorbed power $P_{BAT}^{OUT}$ given by $P_{BAT}(t)$, and a second output port associated with the state of charge noted $SOC^{OUT}$.

It also comprises, when the component comprises at least one input port associated with at least one external variable, a sub-step E23 of determining the expression of the value of each output port depending on at least one variable external to the component. In the example of FIG. 2, the components of level 1 do not depend on any external variable. On the other hand, the input port of the component of level 2 depends on the external variable $P_{PV}^{OUT}$ given by the output port of the component PV and the external variable $P_{BAT}^{OUT}$ given by the output port of the storage component BAT such that $P_{GRID}^{IN} = P_{PV}^{OUT} + P_{BAT}^{OUT}$.

It also comprises a sub-step E24 of determining the constraints linking the internal variables of the component and the external variables if they exist so as to obtain the reduced constraint(s) associated with the considered component. In the example of FIG. 2, the constraints linked to the component PV only depend on its internal variables: $0 \leq P_{PV}^{OUT}(t) \leq P_{FORECAST}(t)$ where $P_{FORECAST}$ is the maximum power that can be supplied given the weather forecasts. Concerning the storage component, the generated constraints also only depend on its internal variables: $\underline{P} \leq P_{BAT}(t) \leq \overline{P}$ where $\underline{P}$ is the maximum power that the component can absorb and $\overline{P}$ is the maximum power that the component can supply, and $0 \leq SOC(t) \leq \overline{SOC}$ where $\overline{SOC}$ is the maximum state of charge, given that $SOC(t) = SOC(t-\Delta t) + P_{BAT}(t) \times \Delta t$ where $\Delta t$ is a given time interval (which corresponds to the time step of the simulation using a model determined using a method according to the invention). Finally, the constraints linked to the network component GRID only depend on its internal variables: $P_{min} \leq P_{GRID}^{IN} \leq P_{max}$ where $P_{min}$ is the maximum power drawn from the network (in other words, the minimum power injected into the network) and $P_{max}$ is the maximum power injected into the network.

In the example of FIG. 2, the preceding sub-steps E21, E22, E23, E24 must be reiterated for the component of level 2, that is to say the network component GRID. For the level 2, during the sub-step E21 of creating the internal variables of the component, no variable is created, said component not comprising any. Similarly, during the sub-step E22 of determining the expression of the value of each port depending on variables internal to the component, no expression is determined, the network component GRID not comprising any internal variable. During the sub-step E23 of determining the expression of the value of each port depending on variables external to the component, the input port $P_{Grid}^{IN}$ is given by the sum of the power supplied by the photovoltaic component $P_{PV}(t)$ and the power supplied or absorbed by the storage component $P_{BAT}(t)$, $(P_{PV}(t) + P_{BAT}(t))$. During the sub-step E24, the output port of the component GRID concerning the income R(t) is given by $R(t) = P_{elec}(t) \times (P_{PV}(t) + P_{BAT}(t)) \Delta t$ where $P_{elec}(t)$ is the price of electricity over the considered period $\Delta t$ (which corresponds to the time step of the simulation using a model determined using a method according to the invention).

The plurality of reduced constraints thus obtained determines the physical model of the electrical installation.

In order to be able to identify the benefits of a method 100 according to the invention, it may be interesting to take the example of FIG. 2 and to apply thereto a method according to the prior art. According to such a method, the components are not taken into account as a function of their level in the tree, but are conversely considered independently, the constraints being taken into account in a second stage. The photovoltaic component is thus represented by $0 \leq P_{PV}(t) \leq P_{FORECAST}$. The storage component is for its part represented by $\underline{P} \leq P_{BAT}(t) \leq \overline{P}$ and $0 \leq SOC(t) \leq \overline{SOC}$, given that $SOC(t) = SOC(t-\Delta t) + P_{BAT}(t) \times \Delta t$ where $\Delta t$ is a given time interval (which corresponds to the time step of the simulation using a model determined using a method according to the invention). The network component GRID is for its part represented by $R(t) = P_{elec}(t) \times P_{GRID}(t) \Delta t$ where $P_{GRID}(t)$ is the power supplied by the network. The constraints are next taken into account. In the case of FIG. 2, it is next necessary to impose a constraint $P_{GRID}(t) = P_{BAT}(t) + P_{PV}(t)$.

It is thus observed that the implementation of a method 100 according to the invention makes it possible to eliminate from the model the variable $P_{GRID}(t)$ and the constraint $P_{GRID}(t) = P_{BAT}(t) + P_{PV}(t)$. The method 100 according to the invention thus makes it possible to obtain a formulation of the model limiting the number of variables and the number of constraints, that is to say to obtain constraints reduced by their number and reduced by the number of variables in their expressions.

Table 1 below makes it possible to illustrate the difference in terms of computation time for an electrical system such as shown in FIG. 2 and assuming a simulation of 24 h with a time step of 1 minute.

TABLE 1

|  | Model obtained with a method of the prior art | Model obtained with a method according to a first aspect of the invention |
| --- | --- | --- |
| Number of variables of the model | 36000 | 10080 |
| Number of constraints of the model | 33120 | 7200 |
| Simulation time | 54 | 21 |

A second aspect of the invention relates to a method for managing an energy installation. The method comprises a first phase of determining a physical model of said installation using a method 100 according to a first aspect of the invention. Thus, at the end of this phase, a model is available comprising a minimum number of variables and constraints, that is to say a physical model ensuring a good level of precision in the computation of the optimal operating trajectories while limiting to the maximum the computational resources required for its implementation.

Once the model has been obtained, the method according to a second aspect of the invention comprises a second control phase. During this phase, each set point is determined as a function of a simulation carried out using the physical model obtained during the phase of determining a physical model of the energy installation. In a more detailed manner, a simulation of the system is carried out with a given time horizon, for example 24 hours, so as to identify the set points making it possible to obtain optimal operation of the energy installation. Obviously, the model used to perform these simulations is obtained using a method according to a first aspect of the invention so as to obtain optimal set points (trajectories) to use by the different energy components while minimising the computational resources required to obtain these set points. Once the optimal set points have been obtained, they are next sent to the energy installation. The process is thus repeated for each new set point at a given frequency, said frequency being a function of the nature of the energy installation (for example at each re-planning of the operation of the energy installation following an updating of weather forecasts which impacts the forecasts of the production component PV and the building consumption component).

It will be appreciated that the method and system described herein provide a technical solution to the technical problem currently faced by the skilled artisan for optimising the use of an energy installation. As explained previously, current models that model an energy installation are complex.

An aspect of the method described herein is specifically tied to the practical application of modelling an energy installation network efficiently. The method recited in the claims provide the technical features and steps that permit one to determine the method for determining a physical model of an energy installation and solve the technical problem identified above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A method for controlling an energy installation comprising:
   performing a first phase of determining a physical model of said installation from a plurality of components linked together according to one or more constraints so as to form a tree of constraints, each component comprising one or more output ports, each output port being associated with a physical quantity of which the value depends on one or more variables internal to the component and/or on one or more variables external to the component, each external variable being communicated to the component through an input port, said determining comprising:
  a step of allocating a level to each component:
    the components not comprising any input port, called leaf components on the tree of constraints, being allocated the lowest level;
    the components comprising one or more input ports being allocated a level greater by one than the maximum level of the components connected on said input port(s);
  a step of determining a plurality of reduced constraints comprising, for each level starting from the lowest level and for each component of the considered level:
    when the component is associated with one or more internal variables, a sub-step of creating the internal variable(s) of the component;
    when the component is associated with one or more internal variables, a sub-step of determining the expression of each output port depending on at least one internal variable of the component;
    when the component comprises at least one input port associated with at least one external variable, a sub-step of determining the expression of each output port depending on at least one variable external to the component a sub-step of determining the constraints linking the internal variables of the component and the external variables if they exist so as to obtain the reduced constraint(s) associated with the considered component, and
  performing a second control phase during which each set point is determined as a function of a simulation carried out using the physical model obtained during the phase of determining a physical model of the energy installation.

2. The method according to claim 1, wherein one or more of the plurality of components are selected from the group consisting of a photovoltaic panel, a wind powered panel, a battery, and a fuel cell.

3. The method according to claim 1, wherein the plurality of components include a photovoltaic component, a storage component and a network component.

4. The method according to claim 1, wherein the one or more variables internal to the component include one or more of a state of charge, a supplied power and an absorbed power.

5. A non-transitory computer readable medium, comprising instructions which, when the instructions are executed by a computer, perform a method for determining a physical model of an energy installation from a plurality of components linked together according to one or more constraints so as to form a tree of constraints, each component comprising one or more output ports, each output port being associated with a physical quantity of which the value depends on one or more variables internal to the component and/or on one or more variables external to the component, each external variable being communicated to the component through an input port, said method comprising:
  a step of allocating a level to each component:
    the components not comprising any input port, called leaf components on the tree of constraints, being allocated the lowest level;
    the components comprising one or more input ports being allocated a level greater by one than the maximum level of the components connected on said input port(s);
  a step of determining a plurality of reduced constraints comprising, for each level starting from the lowest level and for each component of the considered level:
    when the component is associated with one or more internal variables, a sub-step of creating the internal variable(s) of the component;
    when the component is associated with one or more internal variables, a sub-step of determining the expression of each output port depending on at least one internal variable of the component;
    when the component comprises at least one input port associated with at least one external variable, a sub-step of determining the expression of each output port depending on at least one variable external to the component;
  a sub-step of determining the constraints linking the internal variables of the component and the external variables if they exist so as to obtain the reduced constraint(s) associated with the considered component.

6. The non-transitory computer readable medium according to claim 5, wherein one or more of the plurality of components are selected from the group consisting of a photovoltaic panel, a wind powered panel, a battery, and a fuel cell.

7. The non-transitory computer readable medium according to claim 5, wherein the plurality of components include a photovoltaic component, a storage component and a network component.

8. The non-transitory computer readable medium according to claim 5, wherein the one or more variables internal to the component include one or more of a state of charge, a supplied power and an absorbed power.

* * * * *